United States Patent
Shetty et al.

(10) Patent No.: US 6,845,357 B2
(45) Date of Patent: Jan. 18, 2005

(54) PATTERN RECOGNITION USING AN OBSERVABLE OPERATOR MODEL

(75) Inventors: Ravindra K. Shetty, Bangalore (IN); Venkatesan Thyagarajan, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 717 days.

(21) Appl. No.: 09/912,114

(22) Filed: Jul. 24, 2001

(65) Prior Publication Data

US 2003/0088412 A1 May 8, 2003

(51) Int. Cl.$^7$ .............................................. C10L 15/14
(52) U.S. Cl. ..................................... 704/255; 704/256
(58) Field of Search ................................ 704/255, 256

(56) References Cited

U.S. PATENT DOCUMENTS

| | | | |
|---|---|---|---|
| 5,471,557 A | 11/1995 | Chung et al. | 395/2.41 |
| 5,481,644 A | 1/1996 | Inazumi | 395/2.41 |
| 5,511,146 A | 4/1996 | Simar, Jr. | 395/24 |
| 5,600,753 A | 2/1997 | Iso | 395/2.09 |
| 5,751,904 A | 5/1998 | Inazumi | 395/2.41 |
| 5,787,393 A | 7/1998 | Inazumi | 704/232 |
| 5,809,036 A | 9/1998 | Champlin | 371/22.31 |
| 5,857,169 A * | 1/1999 | Seide | 704/256 |
| 5,860,062 A | 1/1999 | Taniguchi et al. | 704/256 |
| 5,983,186 A | 11/1999 | Miyazawa et al. | 704/275 |
| 6,052,662 A | 4/2000 | Hogden | 704/256 |
| 6,151,574 A | 11/2000 | Lee et al. | 704/256 |
| 6,151,592 A | 11/2000 | Inazumi | 706/16 |

OTHER PUBLICATIONS

Jaeger, H., "A short introduction to observable operator models of stochastic processes", *Proceedings of the Cybergenetics and Systems 1998 Conference, Vol.1, Austrian Society for Cybergenetics Study*, 38–43, (1998).

Jaeger, H., "Discrete–time, discrete–valued observable operator models: a tutorial", http://www.gmd.de/People/Herbert.Jaeger/Publication.html German National Research Center for Information Technology (GMD), pp. 1–72, (Jan. 2000).

Rabiner, L.R., "A Tutorial on Hidden Markov Models and Selected Applications in Speech Recognition", *Proceedings of the IEEE*, 77 (2), pp. 257–286, (Feb. 1989).

* cited by examiner

*Primary Examiner*—Susan McFadden
(74) *Attorney, Agent, or Firm*—Kris T. Fredrick (57) ABSTRACT

Data structures, systems, and methods are aspects of pattern recognition using observable operator models (OOMs). OOMs are more efficient than Hidden Markov Models (HMMs). A data structure for an OOM has characteristic events, an initial distribution vector, a probability transition matrix, an occurrence count matrix, and at least one observable operator. System applications include computer systems, cellular phones, wearable computers, home control systems, fire safety or security systems, PDAs, and flight systems. A method of pattern recognition comprises training OOMs, receiving unknown input, computing matching probabilities, selecting the maximum probability, and displaying the match. A method of speech recognition comprises sampling a first input stream, performing a spectral analysis, clustering, training OOMs, and recognizing speech using the OOMs.

41 Claims, 9 Drawing Sheets

PATTERN RECOGNITION USING AN OBSERVABLE OPERATOR MODEL

BACKGROUND

Pattern recognition concerns the operation and design of systems that recognize patterns in data. It encloses subdisciplines like discriminant analysis, feature extraction, error estimation, cluster analysis (together sometimes called statistical pattern recognition), grammatical inference and parsing (sometimes called syntactical pattern recognition). Some applications of pattern recognition are image analysis, character recognition, man and machine diagnostics, person identification, industrial inspection, and speech recognition and analysis.

One application of pattern recognition is speech recognition. Speech recognition is not as efficient as it could be. Many speech recognition techniques are too slow and require too much of a computer's resources to be practical in some computing devices, such as personal digital assistants (PDAs). Some of these inefficient speech recognition techniques use neural networks, dynamic time warping (DTW), and Hidden Markov Models (HMMs). Neural networks for speech recognition require large amounts of training data and long training times. DTW builds templates for matching input speech that need to be fairly exact templates, not allowing for much variability. HMMs, which are commonly used in speech recognition, are too slow and inefficient and it is difficult to mathematically characterize the equivalence of two HMMs.

Figure 1:
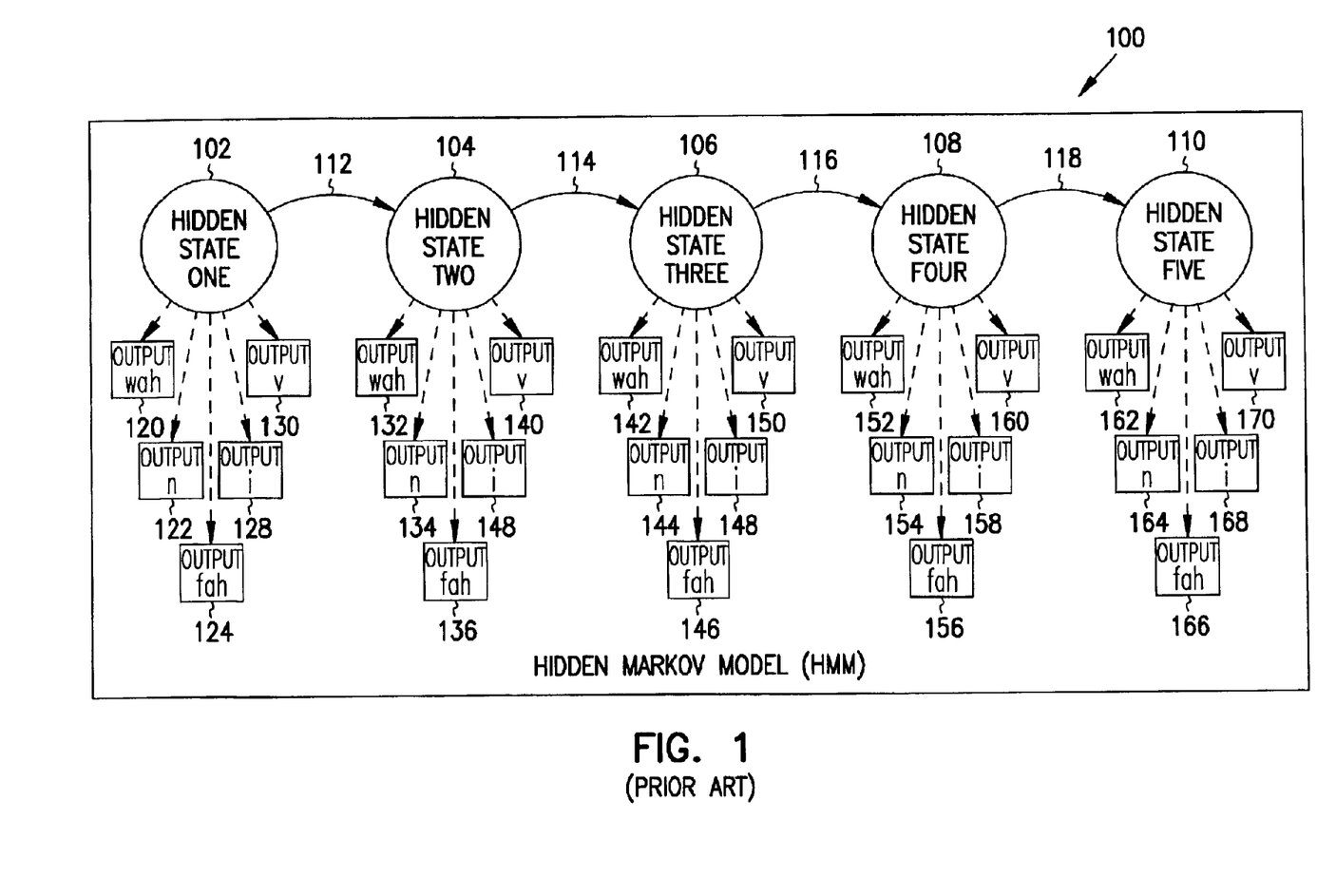
FIG. 1 is a block diagram that shows a conceptual view of a Hidden Markov Model (HMM), which is prior art.

FIG. 1 is a block diagram that shows a conceptual view of a Hidden Markov Model (HMM) 100, which is prior art. In FIG. 1, the HMM 100 has five hidden states 102–110, transitions 112–118 between hidden states 102–110, and outputs 120–170 generated by the hidden states 102–110. In FIG. 1, the transitions 112–118 are shown as solid lines, while output generation from the hidden states 102–110 is shown in dotted lines. An HMM 100 is defined by (1) a set of hidden states ($Q=q_1 q_2 \ldots q_n$), (2) a set of transition probabilities ($A=a_{o1} a_{11} \ldots a_{n1} \ldots a_{nn}$), and (3) a set of observation likelihoods ($B=b_i(o_t)$).

Each hidden state 102–110 ($q_i$) accepts input ($I=i_1 i_2 \ldots i_r$). The input is sometimes called observables and represents one or more parts of speech, phones, phonemes, or processed speech signals. Phonemes capture pronunciation variations by classifying them as abstract classes. A phoneme is a kind of generalization or abstraction over different phonetic realizations. For example, the phonemes for the spoken words "one five" are "wah n fah i v." Suppose input $i_1$ is the phoneme "wah" that is recognized by hidden state one 102 and the next input $i_2$ is the phoneme "n" that is recognized by hidden state two 104.

Each transition 112–118 has a transition probability ($a_{ij}$) representing a probability of transitioning from one hidden state 102–110 to another hidden state 102–110. For example, there might be a 0.5 probability of transitioning from hidden state one 102 to hidden state two 104 upon receiving a certain input, such as the phoneme "wah."

Each observation likelihood ($b_i(o_t)$) expresses the probability of an output ($o_t$) being generated from a hidden state 102–110. For example, in hidden state one 102, there might be a 0.6 probability of generating output "wah", a 0.1 probability of generating output "n," a 0.1 probability of generating output "fah," a 0.1 probability of generating output "i," and a 0.1 probability of generating output "v."

As input speech is recognized, the HMM 100 moves from one hidden state 102–110 to another based on the probability of the transitions 112–118, generating outputs 120–170. The outputs 120–170 are the recognized speech. Speech recognition using HMMs has an algorithmic complexity of $O(n^3)$. There is a need for an alternative to HMMs which is more efficient.

For these reasons and more, there is a need for a more efficient speech recognition technique.

SUMMARY

A method of pattern recognition comprises training observable operator models (OOMs), receiving an unknown input, computing matching transition probabilities, selecting a maximum matching transition probability, and displaying a characteristic event having the maximum matching transition probability. The OOMs are trained for the characteristic events. The OOMs contain observable operators. One matching transition probability is computed for each characteristic event using the observable operators. Each matching transition probability is the probability that the unknown input matches the characteristic event.

A computer-readable medium has computer-executable instructions for performing a method of recognizing speech. The method comprises sampling an input stream, spectral analysis, clustering, training OOMs, and recognizing parts of speech. Sampling the input stream results in samples. Spectral analysis is performed on the samples to obtain feature vectors. Clustering the feature vectors forms observation vectors. The OOMs are trained using the observation vectors. Parts of speech from another input stream are recognized using the OOMs.

A data structure of an OOM is used to recognize patterns. The data structure comprises characteristic events, an initial distribution vector, a probability transition matrix, an occurrence count matrix, and observable operators. The characteristic events correspond to a input stream. The input stream comprises both stream elements and sequences. Each element of the initial distribution vector comprises the particular probability that the characteristic event is an initial event. Each element of the probability transition matrix comprises the estimate of the probability of producing the characteristic event, after observing the sequence. Each element of the occurrence count matrix comprises an estimate of the probability of producing the characteristic event, after observing the stream element followed by the sequence. The observable operators are calculable from the probability transition matrix and the occurrence count matrix. The characteristic events, the initial distribution vector, the probability transition matrix, the occurrence count matrix, and the observable operators are storable on a storage medium during a training phase and retrievable during a recognition phase.

A method for recognizing speech samples an input signal. The method converts the input signal to a discrete signal, stores the discrete signal in a buffer, and reads a frame of data from the buffer. Then, the method checks for silence or noise in the frame, removing any silence and noise from the frame, spectrally flattens a signal in the frame, and performs frame windowing on the frame. Next, the method computes a moving weighted average for the frame, performs feature extraction on the frame using a mathematical model, and clusters the frame with previously read frames. The method trains OOMs and then recognizes unknown words using the OOMs and displays the recognized words.

DETAILED DESCRIPTION

Pattern recognition using an observable operator model are described. In the following detailed description, reference is made to the accompanying drawings which form a part hereof. These drawings show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Figure 2A:
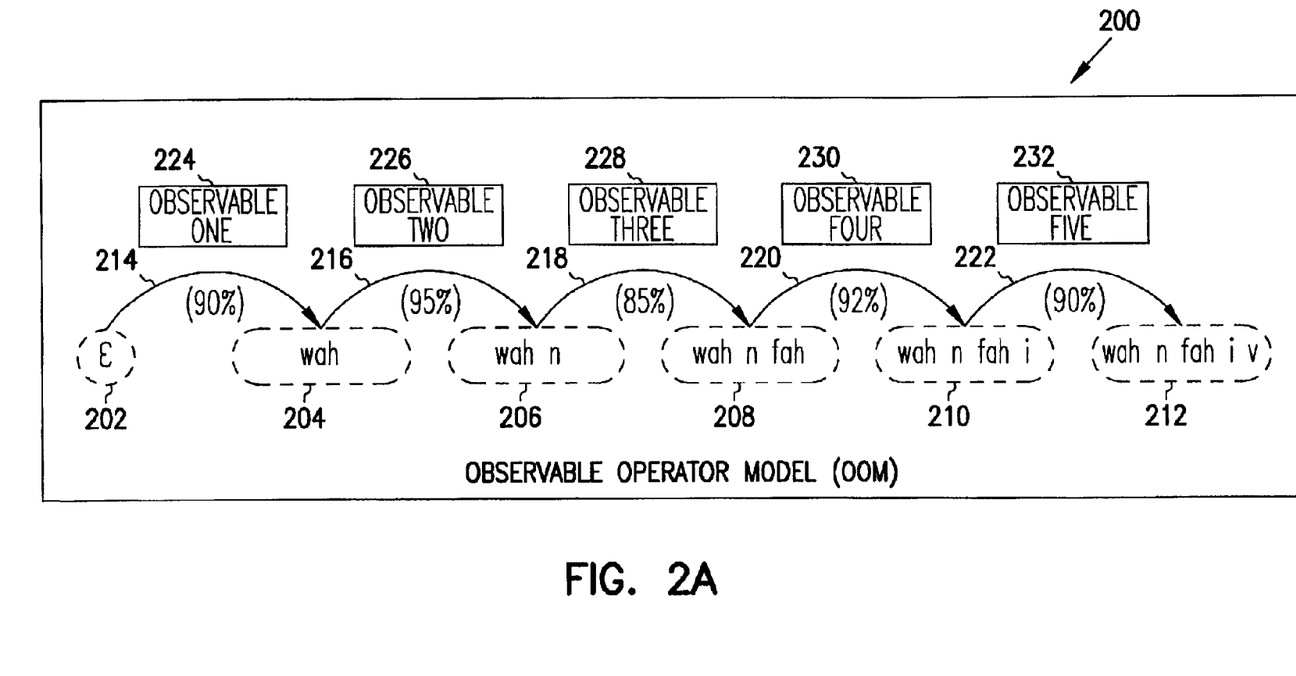
FIG. 2A is a block diagram that shows a conceptual view of an Observable Operator Model (OOM) to be contrasted with the HMM of FIG. 1.

FIG. 2A is a block diagram that shows a conceptual view of an Observable Operator Model (OOM) 200 to be contrasted with the HMM 100 of FIG. 1. OOMs are more expressive than HMMs because OOMs are based on linear algebra. Also, the absence of states in OOMs makes training OOMs to recognize patterns efficient and consistent. OOMs are more constructive for estimating from empirical data than HMMs. While speech recognition using HMMs has an algorithmic complexity of $O(n^3)$, speech recognition using OOMs has an algorithmic complexity of only $O(n+k)$ where k is constant, which is much more efficient.

Unlike HMMs, OOMs have no hidden states to store. The OOM 200 needs no hidden states and the only placeholders are the histories 202–212, which are shown in FIG. 2A as dotted ovals because there are no states. In fact, the OOM 200 may be conceptualized as simply representing a series of transitions of histories for the utterance called operators 214–222, since the operators 214–222 are themselves the observables 224–232.

For example, initially the history 202 is an empty set ($\epsilon$). In general, the history starts with an observable of a phoneme, grows to a group of phonemes, which become words, and then grows to a group of words, which become the sentences recognized, and so on. Observables 224–232 represent the probability of transition from one history to another or in other words probability of transition from one phoneme to another phoneme. Examples transition probabilities are shown in parentheses next to the operators 214–222. The observables may also be syllables, subwords, and the like for speech recognition or parts of images for image recognition or any other types of parts for any kind of pattern recognition. Suppose the observables are the phonemes of one pronunciation of "one five," i.e. "wah", "n," "fah," "i," and "v."

First, to generate the observable one 224, the operator for "wah" 214 is applied. Now, the history 204 is "wah." Next, to generate the observable two 226, the operator for "n" 216 is applied, giving a history of "wah n" 206, which is the word "one." The pause between the words "one" and "five" is ignored. Then, to generate the observable three 228, the operator for "fah" 218 is applied, giving a history of "wah n fah" 208. To generate the observable four 230, the operator for "i" 220 is applied, giving a history of "wah n fah i" 210. To generate the observable five 232, the operator for "v" 222 is applied, giving a history of "wah n fah i v" 212, which make up the words "one five."

The concatenation of the applied operators 212–218 yields the phonemes for the recognized speech, i.e. "wah" o "n" o "fah" o "i" o "v"="wah n fah i v" for the words "one five." As input speech is recognized, the OOM 200 applies various operators 214–222 for the phonemes based on the probability associated with the operators 214–222. The history of applied operators 202–212 grows the recognized speech from an empty set ($\epsilon$) to "wah" then to "wah n" then to "wah n fah" to "wah n fah i" and finally to "wah n fah i v." In this way, the operators are concatenated to form the recognized speech, here a sequence of two spoken numbers. By contrast, in an HMM 100 such as the one shown in FIG. 1, the hidden states 102–110 would generate output 120–170 for the observables "wah n fah i v", but the hidden states 102–110 are not themselves the observables.

In summary, the OOM 200 omits the hidden states 102–108 of an HMM 100, while retaining the functionality. The OOM 200 requires no storage of states, decreasing the memory requirements. Additionally, the OOM 200 increases the algorithmic efficiency, reducing it from $O(n^3)$ to $O(n+k)$ where k is constant.

The present invention incorporates OOMs and has several aspects: systems, data structures, and methods. Each aspect will be described in turn. In addition, an example embodiment is described in detail.

Systems

Figure 3A:
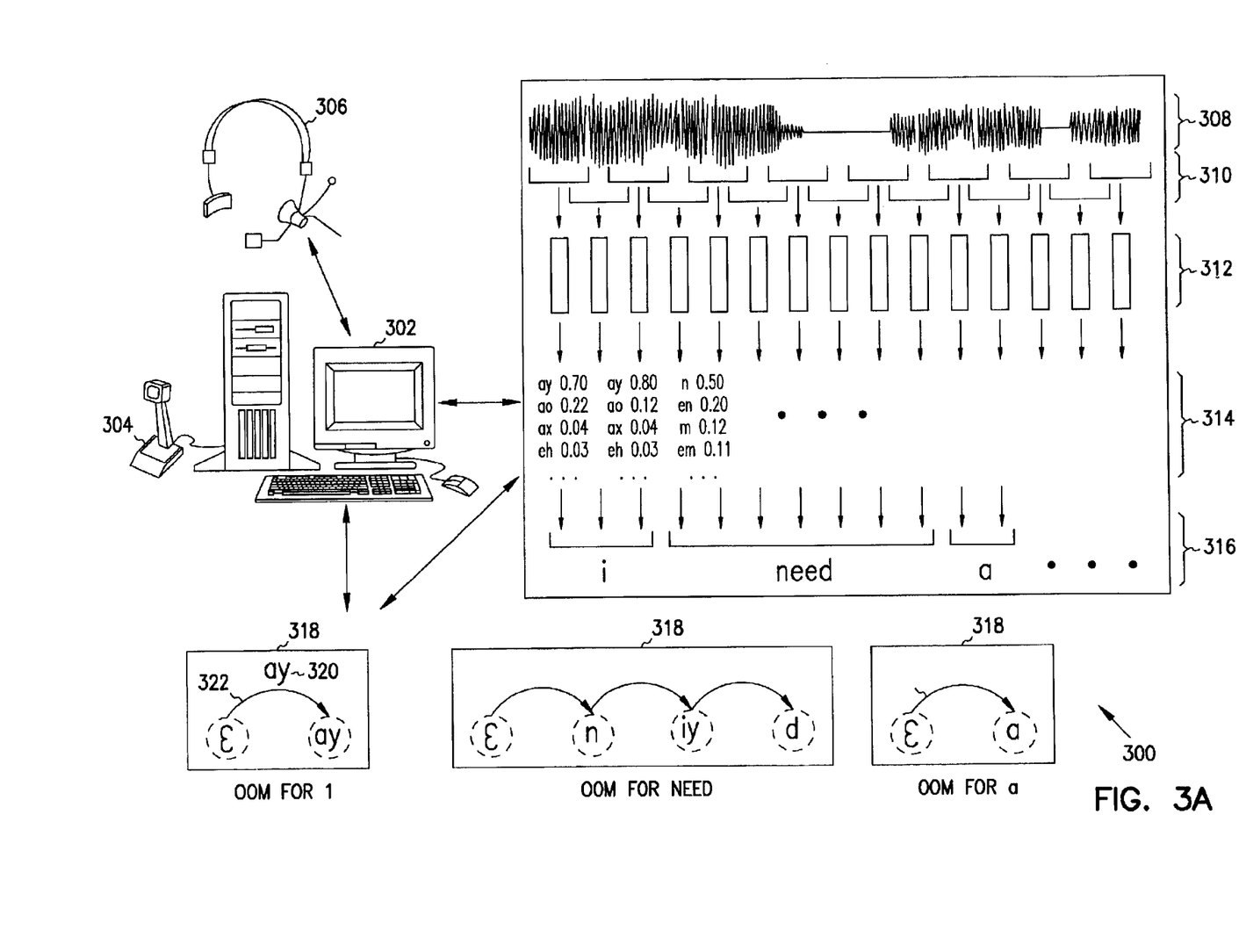
FIG. 3A is a block diagram that shows an embodiment of the present invention in a computer system environment.

FIG. 3A is a block diagram that shows an embodiment of the present invention in a computer system environment 300. The present invention may be embodied as software executable on a computer system 302 having various listening devices, such as microphones 304, 306. The computer system 302 may be any kind of computing device, such as a PDA, personal computer, workstation, or laptop. The listening devices 304, 306 may be peripherals or built into the computer system. The computer system 300 performs speech recognition using at least one OOM 318.

One architecture for a speech recognizer comprises several stages as shown in FIG. 3A. First, speech waveforms 308 are input to the system. In FIG. 3A, the waveform 308 is for the phrase "I need a . . . . " Next, the waveform 308 is processed into frames 310 and then processed into spectral features 312. Then, the spectral features 312 are interpreted using the at least one OOM 318 and transition probabilities are generated for potential matches to parts of the input speech 314. Finally, the recognized words are displayed 316. As speech is recognized by the OOM 318, observable operators 322 generate phonemes of recognized words 320 and a history of the applied observable operators 324 yields the recognized phrase "I need a . . . . " Variations on this architecture and many other architectures are possible embodying the present invention.

Figure 3B:
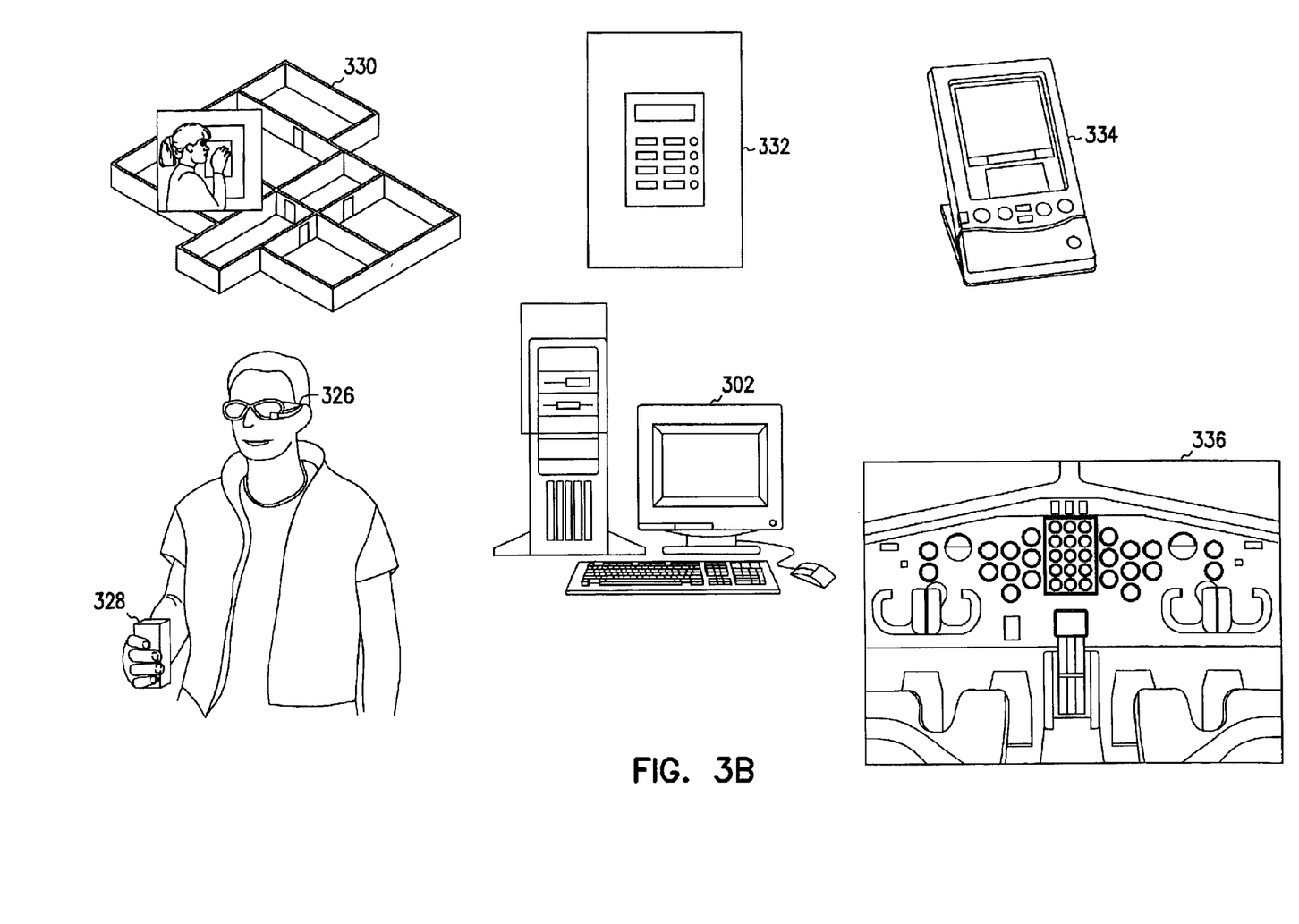
FIG. 3B shows some applications and environments of various embodiments of the present invention, including the one shown in FIG. 3A.

FIG. 3B shows some applications and environments of various embodiments of the present invention, including the one shown in FIG. 3A. The present invention may be embodied in a computer system 302, a cellular phone 328, wearable computers 326, home control systems 330, fire safety or security systems 332, PDAs 334, and flight systems 336. The cellular phone 328 may have a user interface allowing spoken commands to be given to the cellular phone 328. In addition, software accessible from the cellular phone 328 may recognize speech. The efficiency of pattern recognition using OOMs enables applications in small and portable devices, such as wearable computers 326. Wearable computers 326 may include image recognition. Home control systems 330 may accept spoken commands over a phone or within the home, such as "Turn on the air conditioning." Similar commands may be spoken for fire safety and security systems 332, such as "Turn off the alarm." Pattern recognition for PDAs 334 may include handwriting recognition and real-time scheduling. A flight system may allow spoken commands from a pilot or co-pilot. For example, spoken commands may be used when manual controls are malfunctioning or when the pilot's hands are otherwise engaged. As another example, a flight system may match patterns to an optical map for navigation using OOMs.

The present invention may be applied to many other applications, such as computer vision, statistical pattern recognition, structural pattern recognition, image coding and processing, shape and texture analysis, biomedical pattern analysis and information systems, genome mining, remote sensing, industrial applications of pattern matching and image processing, document processing, text mining, multimedia systems, and robotics. In addition, embodiments of the present invention have many other applications and are not limited to the example applications given in this detailed description. Embodiments of the present invention are intended for use with any system or method regardless of what industry the system or method is applied to.

Data Structures

Figure 2B:
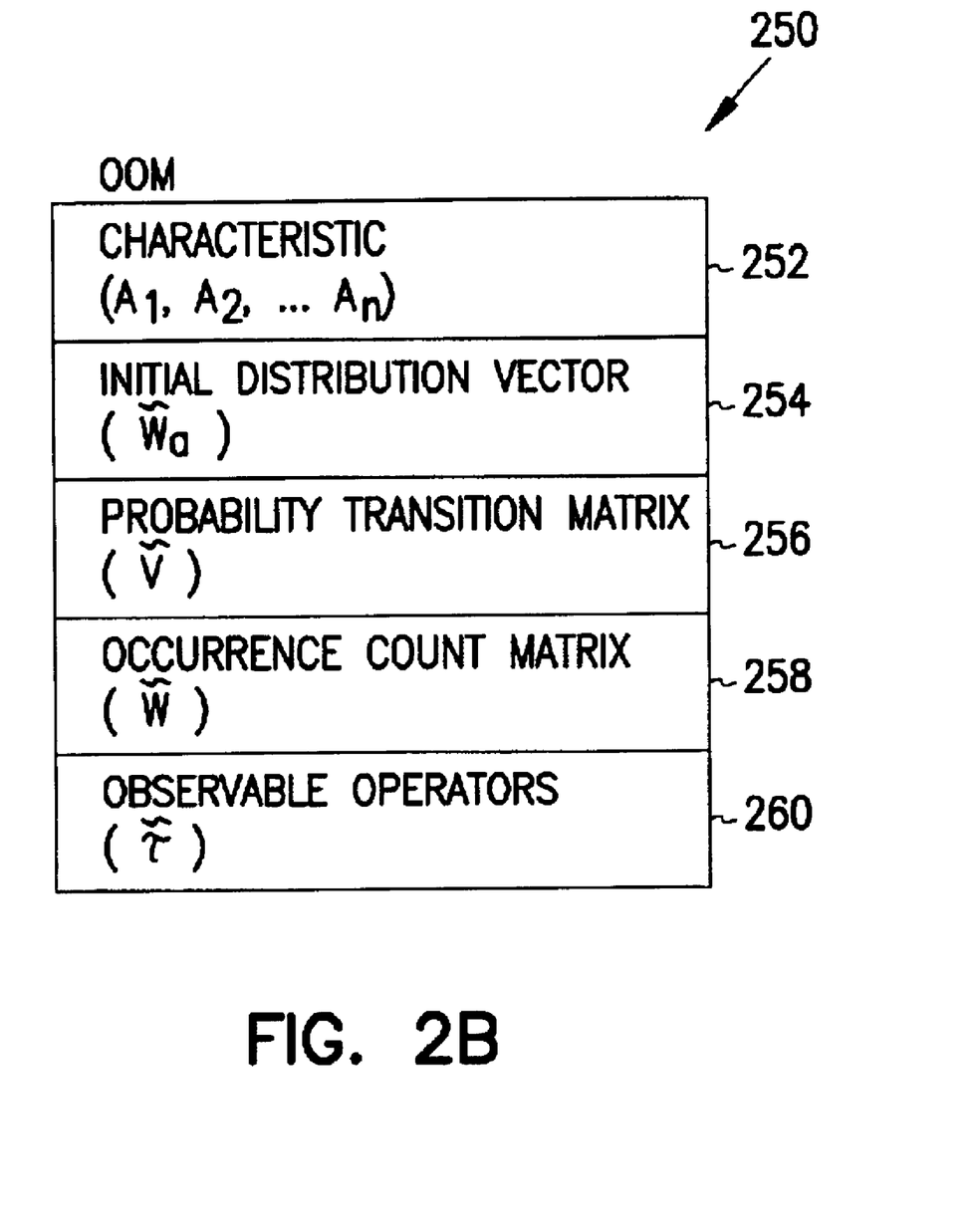
FIG. 2B is a block diagram that shows an embodiment of a physical layout of an OOM.

FIG. 2B is a block diagram that shows an embodiment of a physical layout of an OOM 250. A data structure of an OOM 250 is one aspect of the present invention and is used to recognize patterns. The data structure of an OOM 250 comprises a plurality of characteristic events $(A_1, A_2, \ldots A_n)$ 252, an initial distribution vector $\tilde{W}_o$ 254, a probability transition matrix $(\tilde{V})$ 256, an occurrence count matrix $\tilde{W}$ 258, and at least one observable operator $(\tau)$ 260. The plurality of characteristic events 252 correspond to a input stream (S). The input stream comprises both a plurality of stream elements $(S=a_0 a_1 \ldots)$ and a plurality of sequences $(S=\bar{b}_1, \bar{b}_2, \ldots \bar{b}_m)$ at the same time. For example, stream elements may be a part of speech, phone, or processed speech signal, while the plurality of sequences are words or sentences.

Each element of the initial distribution vector $\tilde{W}_o$ 254 comprises a particular probability that a particular characteristic event $(A_i)$ is an initial event, i.e. $\tilde{W}_o = P(A_i | \epsilon)$. For example, if characteristic events 252 are words, then the probability that the characteristic event $A_i$="one" is the first word in the input stream may be $\tilde{W}_o$ ("one")=P ("one"|$\epsilon$)= 0.9. The particular characteristic event $(A_i)$ is one of the plurality of characteristic events $(A_1, A_2, \ldots A_n)$ 252. For example, the plurality of characteristic events 252 may be ("one," "two," "three" . . . "nine").

Each element $(\tilde{V}_{ij})$ of the probability transition matrix $(\tilde{V})$ 256 comprises an estimate of a particular probability of producing a particular characteristic event $(A_i)$, after observing a particular sequence $\bar{b}_j$, i.e. $\tilde{V}_{ij} = P(A_i | \bar{b}_j)$. For example, the probability of producing a "two" after observing "one two three" may be $V_{2,18} = P$ ("two"|"one two three")=0.2.

Each element of the occurrence count matrix $(\tilde{W}_{ij})$ 258 comprises an estimate of a particular probability of producing the particular characteristic event $(A_i)$, after observing a particular stream element $(a_i)$ followed by the particular sequence $(\bar{b}_j)$, i.e. $\tilde{W}_{ij} = P(A_i | a_i \bar{b}_j)$. If the input speech is "I need", which has phones "ay n iy d," the characteristic events 252 are words, and stream elements and sequences are phones, then an estimate of the probability of producing "need" after observing the stream element that is phone "d" followed by the particular sequence of phones "ay n iy" may be $\tilde{W}_{26,439} = P$ ("need"|"d" "ay n iy")=0.9.

The at least one observable operator $(\tau)$ 260 is calculable from the probability transition matrix $(\tilde{V})$ 256 and the occurrence count matrix $(\tilde{W}_{ij})$ 258. An observable operator $(\tau)$ 260 may be created for each input. For example, an observable operator 260 may be the word "need" which is applied during recognition of the input phones "n iy d."

The plurality of characteristic events $(A_1, A_2, \ldots A_n)$ 252, the initial distribution vector $(\tilde{W}_o)$ 254, the probability transition matrix $(\tilde{V})$ 256, the occurrence count matrix $(\tilde{W})$ 258, and the at least one observable operator $(\tau)$ 260 are storable on a storage medium during a training phase and retrievable during a recognition phase. The training phase is that part of speech recognition for training OOMs to recognize one or more vocabularies. The recognition phase is that part of speech recognition for using trained OOMs to recognize speech. The storage medium may be any kind of storage medium, such as a hard drive, floppy disk, EEPROM, EPROM, flash memory, PROM, RAM, ROM, mass storage devices and the like.

In another embodiment, a computer-readable medium has computer-executable instructions for performing a method for modeling a process with the data structure of the OOM 250. The method comprises creating at least one data structure of the OOM 250 and storing each of the parts of the at least one data structure of the OOM 250. The method includes storing the plurality of characteristic events $(A_1, A_2, \ldots A_n)$ 252, storing the initial distribution vector $(\tilde{W}_o)$ 254, storing the probability transition matrix $(\tilde{V})$ 256, storing the occurrence count matrix $(\tilde{W})$ 258, and storing the at least one observable operator $(\tau)$ 260.

In another embodiment, the method further comprises reading the plurality of characteristic events $(A_1, A_2, \ldots A_n)$ 252 of the at least one data structure of the OOM 250 and reading each of the parts of the at least one data structure of the OOM 250. The method includes reading the plurality of characteristic events $(A_1, A_2, \ldots A_n)$ 252, reading the initial distribution vector $(\tilde{W}_o)$ 254, reading the probability transition matrix $(\tilde{V})$ 256, reading the occurrence count matrix $(\tilde{W})$ 258, and reading the at least one observable operator $(\tau)$ 260.

In one embodiment of the data structure 250, each element of the occurrence count matrix $(\tilde{W}_{ij})$ 258 comprises a calculation, during the training phase, of how frequently the particular characteristic event $(A_i)$ occurs after observing the particular stream element $(a_i)$ followed by the particular sequence $(\bar{b}_j)$. The calculation may be a probability between 0 and 1. In another embodiment of the data structure, each element $(\tilde{W}_{ij})$ of the occurrence count matrix $(\tilde{W})$ 258 comprises a number of occurrences of the particular stream element $(a_i)$ followed by the particular sequence $(\bar{b}_j)$, the number being countable during the training phase.

In another embodiment of the data structure 250, each element $(\tilde{V}_{ij})$ of the probability transition matrix $(\tilde{V})$ 256 comprises a calculation, during the training phase, of how frequently the particular characteristic event $(A_i)$ occurs, after observing the particular sequence $(\bar{b}_j)$. In another embodiment, each element ($\tilde{V}_{ij}$) of the probability transition matrix ($\tilde{V}$) 256 comprises a number of occurrences of the particular sequence ($\bar{b}_j$), the number being countable during the training phase.

In another embodiment of the data structure 250, the at least one observable operator ($\tau$) 260 is a linear, observable operator. Many well-known linear algebra techniques may be applied to the OOMs. The OOMs may be used to model various stochastic processes. In another embodiment of the data structure 250, the at least one observable operator ($\tau$) 260 is equal to the inverse of the probability transition matrix ($V$) 256 times an element ($\tilde{W}_1^j$) of the occurrence count matrix ($W$). For example, $\tau_1^j = \tilde{V}^{-1} \tilde{W}_1^j$ for i=1 to the number of characteristic events 252 and for j=1 to the number of recognizable sequences in a vocabulary according to a grammar.

In another embodiment of the data structure 250, the columns of the probability transition matrix ($\tilde{V}$) 256 sum to 1. In another embodiment of the data structure 250, the elements of the initial distribution vector ($\tilde{W}_o$) 254 sum to 1. In another embodiment of the data structure 250, at least one element of the matrices and vectors is a negative value.

Methods

Figure 4:
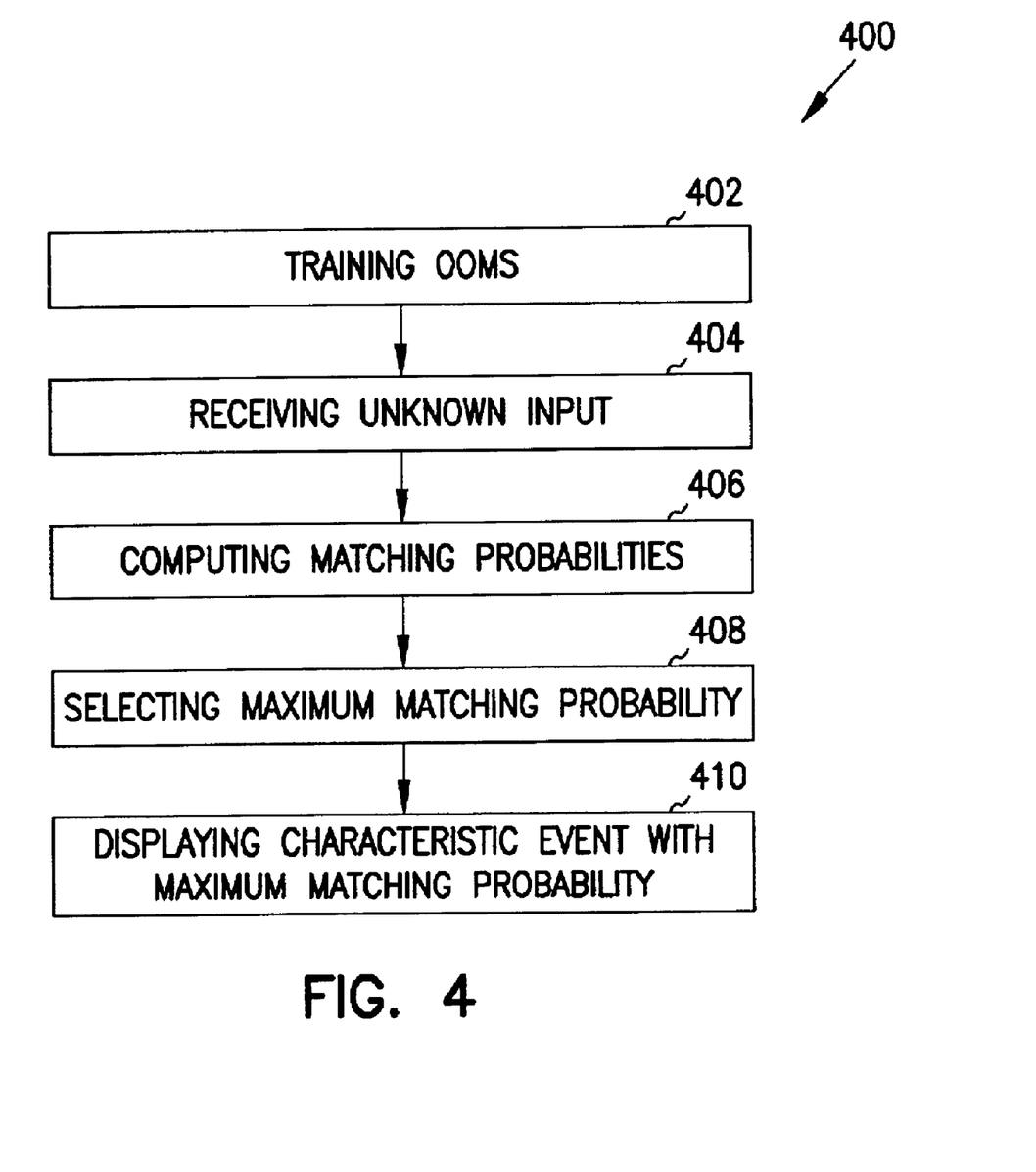
FIG. 4 is a flow chart that shows an embodiment of a method of pattern recognition.

FIG. 4 is a flow chart that shows an embodiment of a method of pattern recognition 400. One aspect of the present invention is a method of pattern recognition 400. The method 400 comprises training a plurality of OOMs 402, receiving an unknown input 404, computing a plurality of matching probabilities 406, selecting a maximum matching probability 408, and displaying a characteristic event having the maximum matching probability 410. The plurality of OOMs are capable of being trained for a plurality of characteristic events. The OOMs comprise a plurality of observable operators. One matching probability is computed for each one of the plurality of characteristic events using the plurality of observable operators. Each matching probability is a probability that the unknown input matches a particular characteristic event. The maximum matching probability is selected from the plurality of matching probabilities. The characteristic event having the maximum matching probability is the pattern that matches the unknown input.

In one embodiment, the unknown input occurs at a particular point in an input stream. The input stream comprises a sequence occurring prior to the unknown input.

In another embodiment, each matching probability is a probability that the unknown input matches a particular characteristic event, given the sequence occurring prior to the unknown input.

In another embodiment, the unknown input is a word and the characteristic events define a vocabulary.

In another embodiment, the training act comprises: computing a probability transition matrix, computing an occurrence count matrix, estimating the plurality of observable operators from the probability transition matrix and the occurrence count matrix; and standardizing the plurality of observable operators. In another embodiment, standardizing the plurality of observable operators further comprises computing a mean and standard deviation for each observable operator.

Figure 5:
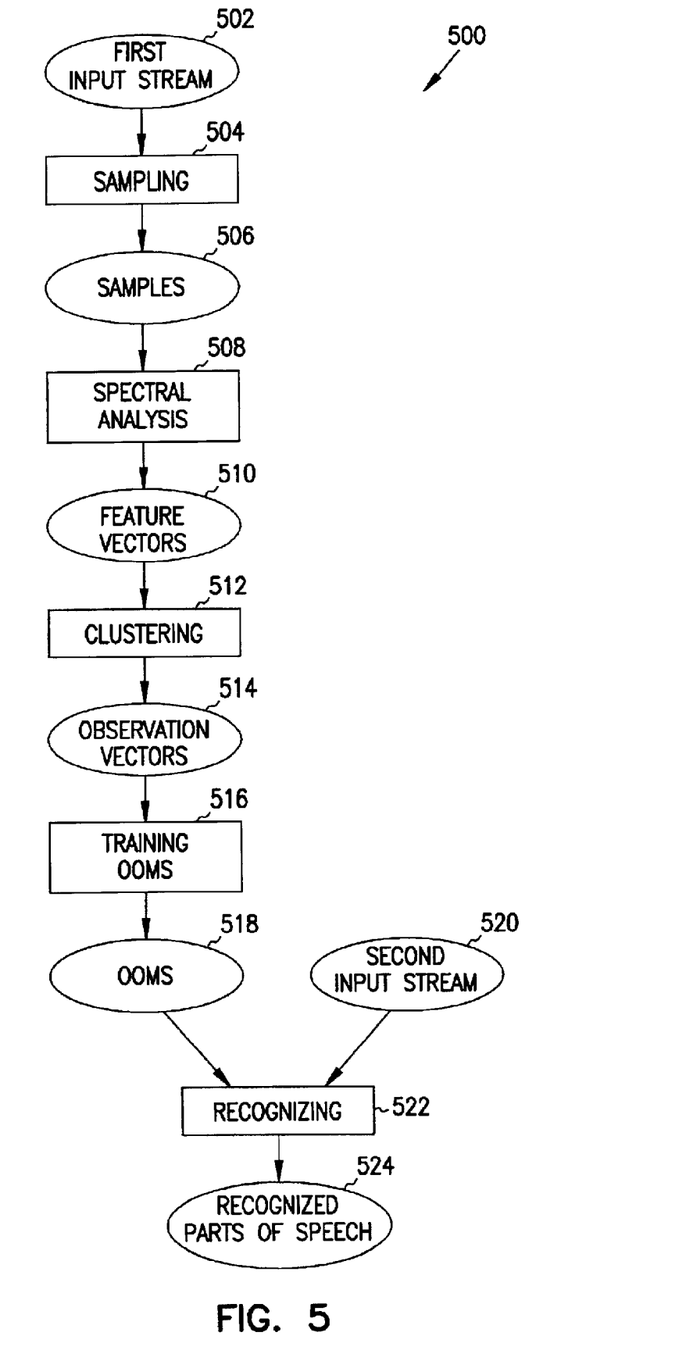
FIG. 5 is a flow chart that shows an embodiment of a method of recognizing speech.

FIG. 5 is a flow chart that shows an embodiment of a method of recognizing speech 500. One aspect of the present invention is a computer-readable medium having computer-executable instructions for performing a method of recognizing speech 500. The method 500 comprises sampling 504 a first input stream 502, resulting in a plurality of samples 506, performing a spectral analysis 508 of the samples 506 to obtain a plurality of feature vectors 510, clustering 512 the feature vectors 510 to form a plurality of observation vectors 514, training 516 at least one OOM 518 using the observation vectors 514, and recognizing 522 at least one part of speech 524 from a second input stream 520 using the at least one OOM 518.

Sampling 504 is basically converting a continuous time signal to a discrete time signal. The sampling frequency defines the ability to retrieve the original signal. According to the Nyquist criterion, as long as the sampling frequency ($f_s$) satisfies the condition, $f_s$ is greater than or equal to 2W, where W is the highest frequency components in the input signal, the signal can be completely reconstructed from its samples. Human speech is substantially bandlimited to about 3.5 kHz; therefore, a sampling frequency above about 7 kHz, such as 8 kHz, may be used for the present invention.

In one embodiment, the spectral analysis 508 comprises removing noise from the samples 506, performing pre-emphasis on the samples 506 in order to spectrally flatten the samples, blocking the spectrally flattened samples into framed samples, windowing the framed samples to obtain windowed samples with signal energy substantially concentrated at the center of the frames, performing auto-correlation analysis for each windowed sample to obtain auto-correlated samples, and performing linear predictive coding (LPC) analysis for each auto-correlated sample to obtain feature vectors 510. The samples may be stored in .wav files. Pre-emphasis is a process for digitizing sampled speech signals by passing the signals through a low order digital filter in order to spectrally flatten it. Input speech may be represented as frames of a finite time duration, such as 20–30 milliseconds (ms) within which the speech signal is quasi-stationary. A speech frame may be represented by 256 discrete data samples or vectors.

In another embodiment, the at least one OOM 518 is stateless. In another embodiment, a probability of selecting an operator is computed using the operator itself. In another embodiment, the computational efficiency is about O(n+k) where n is a number of samples and k is a constant. In another embodiment, the at least one part of speech 524 comprises a concatenation of a plurality of operators.

Figure 6A:
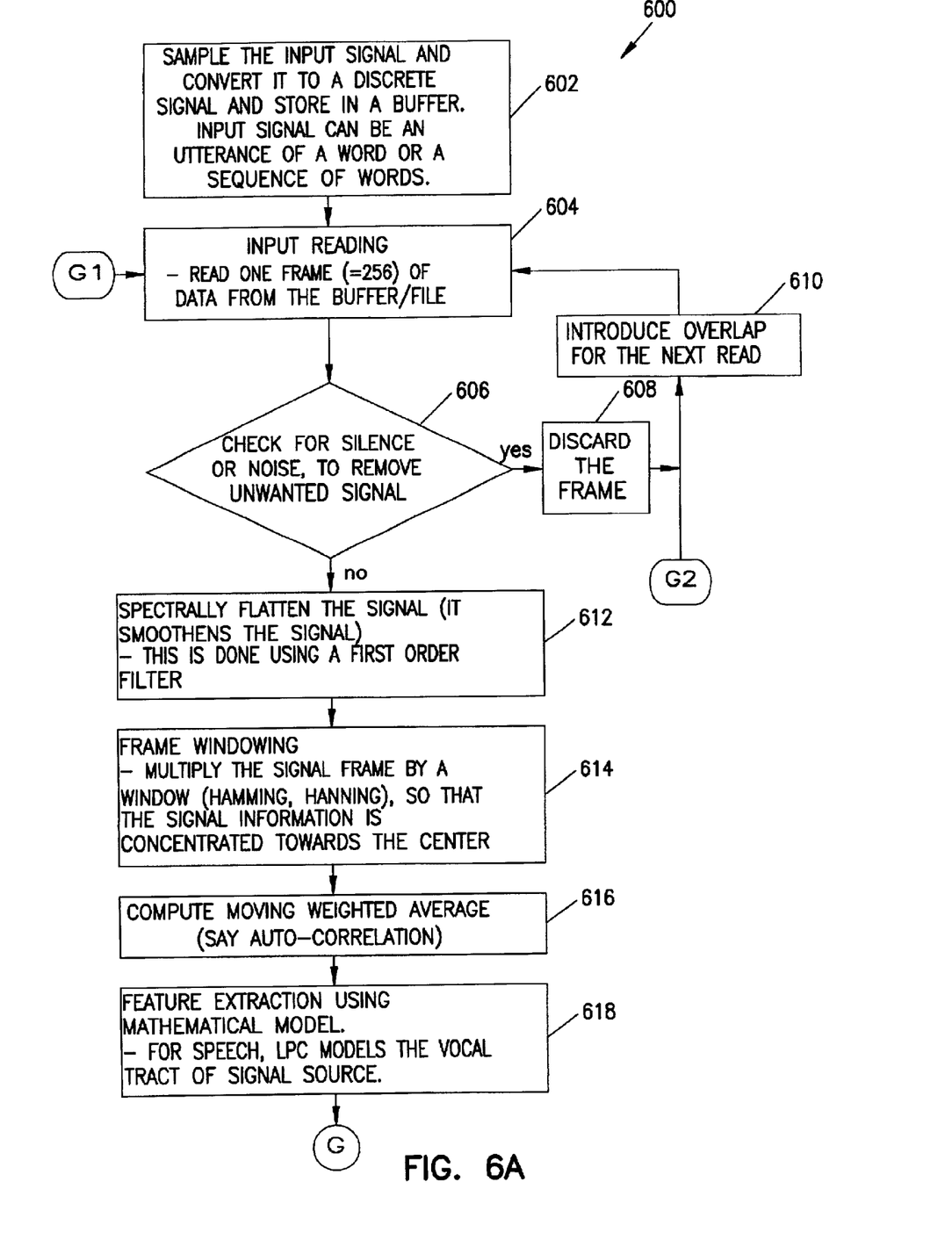
FIG. 6 is a more detailed flow chart than FIG. 5 and shows a more detailed embodiment of a method of recognizing speech.
Figure 6B:
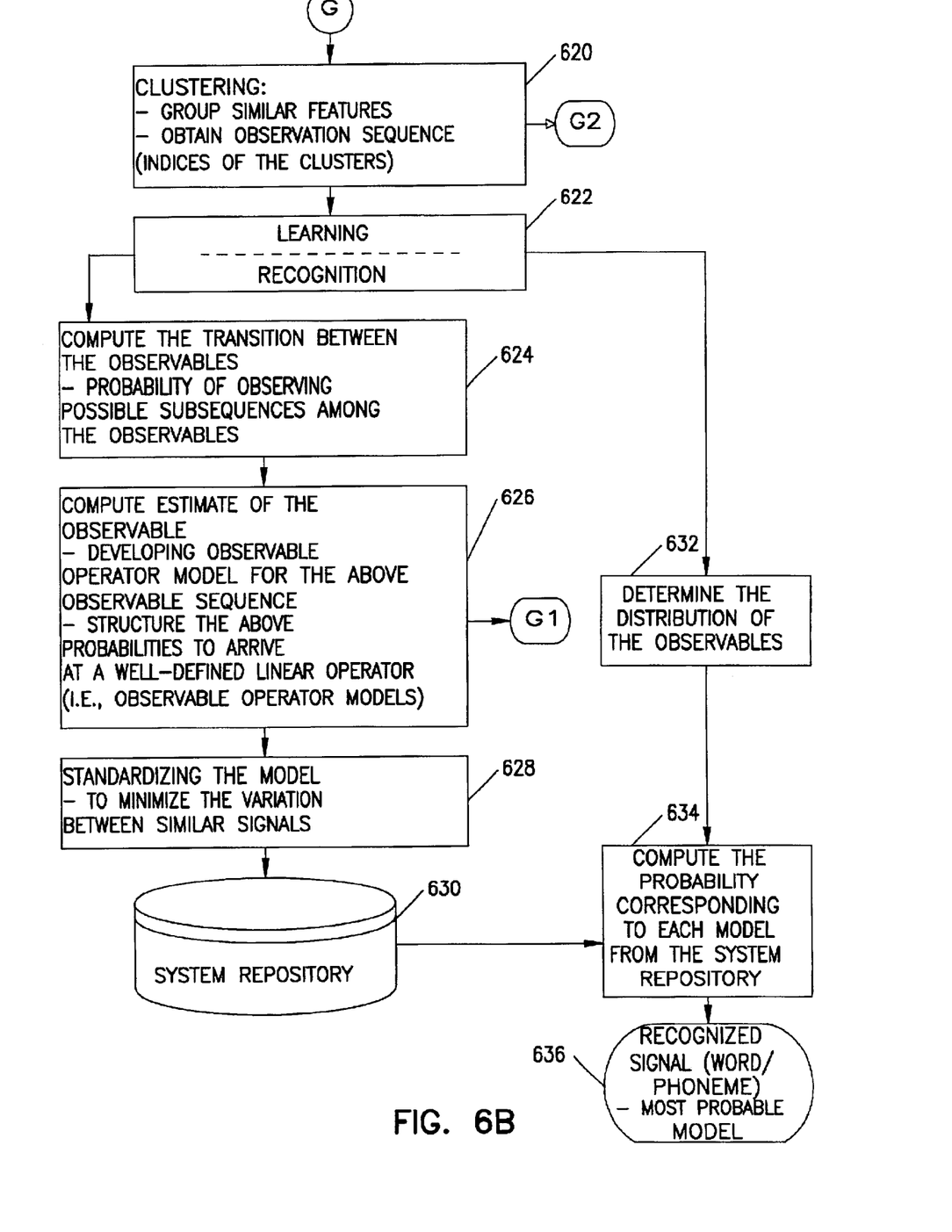

FIG. 6 is a more detailed flow chart than FIG. 5 and shows a more detailed embodiment of a method of recognizing speech 600. One aspect of the present invention is a method for recognizing speech 600. The method 600 comprises sampling an input signal 602, converting the input signal to a discrete signal 602, storing the discrete signal in a buffer 602, reading a frame of data from the buffer 604, checking for silence or noise in the frame 606, removing any silence and noise from the frame 606, spectrally flattening a signal in the frame 612, performing frame windowing on the frame 614, computing a moving weighted average for the frame 616, performing feature extraction on the frame using a mathematical model 618, clustering the frame with previously read frames 620, training a plurality of OOMs 622, recognizing at least one unknown word using the OOMs 622, and displaying a recognized word corresponding to the at least one unknown word 636.

In one embodiment, reading the frame of data from the buffer 604 is performed repeatedly, until the input signal is exhausted.

In another embodiment, the method 600 further comprises discarding the frame and reading a next frame 608 and introducing overlap for a next read 610.

In another embodiment, spectrally flattening the signal 612 is performed using a first order filter 612.

In another embodiment, performing frame windowing 614 is performed by multiplying the signal in the frame by a window so that information in the signal is concentrated substantially towards a center of the frame 614. In another embodiment, the window is selected from the group consisting of a Hamming window and a Hanning window. Hamming windowing techniques minimize effects due to frame blocking, such as a loss of features between adjacent frames.

In another embodiment, computing the moving weighted average for the frame 616 is performed using auto-correlation 616. Auto-correlation analysis compares a signal under consideration with a delayed copy of itself. Auto-correlation is commonly used because of its computational efficiency.

In another embodiment, the mathematical model is linear predictive coding (LPC) 618. In another embodiment, the linear predictive coding (LPC) models a vocal tract. In LPC analysis, a signal is represented with a lesser number of vectors thereby reducing the amount of data for processing. These vectors represent features of the spoken sounds.

In another embodiment, clustering the frame with previously read frames 620 comprises grouping similar features 620. In another embodiment, clustering the frame with previously read frames 620 comprises obtaining an observation sequence 620. In another embodiment, obtaining the observation sequence 620 comprises obtaining indices of the clusters. 620. The results of feature extraction are a series of vectors representing time-varying spectral properties of the speech signal. These feature vectors are clustered, which efficiently represents spectral information in the speech signal. These clustered values form the observation sequence of speech or spoken word or utterance.

In another embodiment, training the plurality of OOMs 622 comprises computing a transition between observables in the observation sequence 624 and computing an estimate of the observables 626. In another embodiment, computing the transition between observables in the observation sequence 624 is performed by computing a probability of observing possible subsequences among the observables 624. In another embodiment, computing an estimate of the observables 626 comprises developing the plurality of OOMs and structuring the probability to produce substantially well-defined linear operators for the plurality of OOMs 626. In another embodiment, the method 600 further comprises standardizing the plurality of OOMs such that variation between similar signals is substantially minimized 628 and storing the plurality of OOMs in a system repository 630. From an observation sequence, OOMs are developed and linear operators are computed and refined for different samples of the same speech. The refined linear operators of the OOMs may be standardized for a vocabulary.

In another embodiment, recognizing the at least one unknown word using the plurality of OOMs 622 comprises: determining a distribution of the observables 632, computing a probability for each of the plurality of OOMs in the system repository 634, and selecting a most probable one of the plurality of OOMs as the at least one recognized word 636. For an unknown speech input, from the observation sequence using standardized operator models, the method 600 may find the most probable word that was uttered or spoken.

Example Embodiment

One example embodiment of the present invention is a method of recognizing speech comprising eleven phases: (1) input reading, (2) silence check, (3) pre-emphasis, (4) blocking into frames, (5) frame windowing, (6) moving weighted average, (7) feature extraction, (8) clustering, (9) OOM training, (10) OOM recognition, and (11) displaying the recognized speech.

Phase 1: Input Reading

Input reading is performed according to the pseudocode in Table 1.

TABLE 1

Read one frame of $W_{length}$ of speech file from a buffer (circular/application dependent)
$S_n[n] \leftarrow$ Buffer n:1 to $W_{length}$ where $W_{length}$ = 256/512, $S_n$- is the input signal;
$W_{length}$ = length of the frame window.
Example input:
{[−1638, −2375, −2327, −705, . . ., 2689, 2536,2533],[2310, 2068, 2168, . . ., −3344, −3536], . . .,[1476, 1028, −705, . . . , 0]}.

Phase 2: Silence Check

A silence check involves computing $A_{mag\_function}$ according to the pseudocode in Table 2.

TABLE 2

$$A_{mag\_function}[n] = \sum_{m=0}^{W_{length}-1} |S[m]| * W[n-m]$$

n: 1 to 2 * $W_{length}$, W(n): rectangular window. If Peak_signal_level in $A_{mag\_function}[n]$ is greater than peak signal in background noise, then go to phase 3 (Pre-emphasis), else go to phase 1 (Input reading) and read the next frame from the buffer.
Average Magnitude = 2285797.000000
Peak signal in the background noise = 353268.000000. Here the average magnitude function is greater than the peak signal in the background noise, so it is processed.
Otherwise, the next frame would be selected.

Phase 3: Pre-Emphasis

During pre-emphasis, one spectrally flattens (smoothens) the signal using a first order filter, say digital for this prototype. The example embodiment performs pre-emphasis according to the pseudocode in Table 3.

TABLE 3

$H(Z) = (1 - \alpha Z^{-1})$ where $\alpha = 0.95$
Implementation:

TABLE 3-continued $\overline{S}_n[n] = S_n[n] - \alpha S_n[n-1]$ n:1 to $W_{length}$
$S_n$: is the input signal and $\overline{S}_n$: is the smoothened signal.
The resulting smoothened signal is:
{[2813,2202,2117,2031, . . . , 22908,22677,22452], [22226,22002,21783,21565 . . .
21105,20912,207041 . . .[32767,32302,32115 . . . 2495,2404,1829]}.

Phase 4: Blocking into Frames

In the example embodiment, an overlapping windowing technique is used.

Phase 5: Frame Windowing

Frame windowing is accomplished in the example embodiment according to the pseudocode in Table 4.

TABLE 4

$$H_{window} = 0.54 - 0.46 \cos\left(\frac{w \cdot n}{W_{length} - 1}\right)$$

Implementation:

$$\overline{s}_n(i) = \left(\left(0.54 - 0.46 \cos\left(2 * 3.1415 * \frac{i}{W_{length-1}}\right)\right) \overline{s}_n(n)\right)$$

$W_{length}$: 256/512 (Hamming window is used).
The resulting windowed frames are: {[640, 2620, 954, . . . ,
451, 436], [2600, 2571, 2564, . . . , 469, 363], . . . ,
[2621, 2589, 2589, . . . , 192, 146]}.

Phase 6: Moving Weighted Average

The moving weighted average is done using auto correlation analysis in the example embodiment according to the pseudocode in Table 5.

TABLE 5

$$R(k) = \sum_{n=k}^{W_{length}} S_n[n] S_n[n-k] \quad k = 1 \text{ to } W_{length}$$

R(k) = Auto correlated signal
Here are the auto-correlated signals.
{[20.8867310, 16.0445961, 13.3677628, . . . , 11.1407490, 11.1278157],
[20.9092224, 14.0876381, 11.6661979, . . . , 7.3052835,
7.3219320], . . . , [3.8527865, 3.7355603, 3.5064851,
1.1888458, 0.8282634]}.

Phase 7: Feature Extraction

In the example embodiment, feature extraction is performed using Linear Predictive Coding (LPC) according to the pseudocode in Table 6.

TABLE 6

LPC Coefficients: Conversion of each frame of (lpc_order + 1) auto correlations into LPC parameter set $$\sum_{i=1}^{10} a_i R(|i-k|) = -R(k)$$

k = 1, . . . lpc_order
Solve the above equation using the Levinson-Durbin algorithm
$E^{[0]} = R(0)$ for i = 1
to lpc_order $a_0^{[i-1]} = 1$ TABLE 6-continued $$k_i = -\left[\frac{R(i) - \sum_{j=0}^{i-1} a_j^{i-1} R(|i-j|)}{E^{i-1}}\right]$$

$a_i^i = k_i$ for j = 1 to i - 1

$a_j^i = a_j^{i-1} - k_i a_{i-j}^{i-1}$ $E^{[i]} = (1 - k_i^2) E^{[i-1]}$

The result is: {[1.000, 0.16, 0.17, 0.002, . . . , 0.007, 0.05],
[1.000, 0.60, 0.04, 0.04, . . . , 0.04. 0.80], . . . ,
[1.000, 0.33, 0.16, . . . , 0.01, 0.02]}.

Phase 8: Clustering

Clustering is performed for the example embodiment according to the pseudocode in Table 7.

TABLE 7

Map LPC coefficient to appropriate clusters (n)
Use K-means clustering algorithm to form clusters
Loop until the termination condition is met (all the features are grouped)
1. For each feature extracted, assign that feature to a cluster such that the distance from this feature to the center of that cluster is minimized (below the threshold).
2. else
Form a new cluster and make the current feature as the center for that cluster if the number of clusters is below the maximum number of clusters otherwise club two nearest clusters and form a new one.
3. For each cluster, recalculate the means of the class based on the current input that belong to that cluster.
End loop;
The result is:
41110100004200000000420000000041110000004200000000410011001042000001114200000000441011212100. (The cluster indices are 0, 1, 2, 3, 4, as 5 clusters are assumed).

Phase 9: OOM Training

The OOM training phase for the example embodiment is performed according to the pseudocode in Table 8.

TABLE 8

For one utterance:

| | | | | |
|---|---|---|---|---|
| 0.775786 | −0.283102 | 0.537308 | −1.000183 | 0.134236 |
| 0.046371 | 0.195399 | −0.305251 | 0.551878 | −0.078152 |
| 0.000000 | 0.000000 | 0.000000 | 0.000000 | 0.000000 |
| 0.000000 | 0.000000 | 0.000000 | 0.000000 | 0.000000 |
| 0.166687 | 0.103796 | −0.232240 | 0.442179 | −0.059193 |
| −0.014285 | 0.364870 | 0.431460 | −1.101652 | 0.112594 |
| −0.019954 | 0.405836 | −0.273551 | 0.280480 | 0.127408 |
| 0.054519 | 0.150858 | −0.266866 | 1.115551 | −0.314496 |
| 0.000000 | 0.000000 | 0.000000 | 0.000000 | 0.000000 |
| −0.020280 | 0.078436 | 0.108957 | −0.294379 | 0.074494 |
| −0.164208 | −0.107372 | 0.565614 | −1.496373 | 0.837662 |

TABLE 8-continued

| | | | | |
|---|---|---|---|---|
| 0.070003 | 0.243274 | −0.233825 | 1.555749 | −0.419471 |
| 0.094205 | −0.135902 | 0.668211 | −0.059376 | −0.418191 |
| 0.000000 | 0.000000 | 0.000000 | 0.000000 | 0.000000 |
| 0.000000 | 0.000000 | 0.000000 | 0.000000 | 0.000000 |
| 0.000000 | 0.000000 | 0.000000 | 0.000000 | 0.000000 |
| −0.017882 | −0.006990 | 0.037958 | −0.117288 | 0.089734 |
| −0.000000 | −0.000000 | 0.000000 | 0.500000 | 0.000000 |
| −0.035764 | −0.013980 | 0.075916 | −0.234577 | 0.179468 |
| 0.053645 | 0.020970 | −0.113875 | 0.851865 | −0.269203 |
| −0.017882 | −0.006990 | 0.037958 | −0.117288 | 0.089734 |
| −0.002296 | −0.062261 | 0.076465 | −0.216197 | 0.188795 |
| 0.112432 | −0.031049 | −0.151162 | 0.324951 | −0.014204 |
| −0.017008 | 0.122897 | −0.115033 | 0.646397 | 0.044440 |
| −0.075246 | −0.022596 | 0.151772 | −0.637863 | 0.691234 |

The standardized model is:

| | | | | |
|---|---|---|---|---|
| 0.767662 | −0.339089 | 0.483050 | −0.885074 | 0.177034 |
| 0.031172 | 0.060543 | −0.122124 | 0.227248 | −0.026543 |
| 0.000000 | 0.000000 | 0.000000 | 0.000000 | 0.000000 |
| 0.000000 | 0.000000 | 0.000000 | 0.000000 | 0.000000 |
| 0.187603 | 0.323748 | −0.391520 | 0.703454 | −0.164579 |
| −0.013354 | 0.489112 | 0.247563 | −0.790733 | 0.102105 |
| −0.012196 | 0.428517 | −0.277192 | 0.313488 | 0.053278 |
| 0.067188 | 0.139648 | −0.230926 | 1.064319 | −0.344581 |
| 0.000000 | 0.000000 | 0.000000 | 0.000000 | 0.000000 |
| −0.041639 | −0.057277 | 0.260557 | −0.587074 | 0.189199 |
| −0.153533 | −0.124400 | 0.586278 | −1.444615 | 0.758117 |
| 0.099331 | 0.454268 | −0.419818 | 1.878696 | −0.532384 |
| 0.054201 | −0.239868 | 0.833440 | −0.434080 | −0.225733 |
| 0.000000 | 0.000000 | 0.000000 | 0.000000 | 0.000000 |
| 0.000000 | 0.000000 | 0.000000 | 0.000000 | 0.000000 |
| 0.000000 | 0.000000 | 0.000000 | 0.000000 | 0.000000 |
| −0.022250 | −0.024902 | 0.051477 | −0.144158 | 0.107312 |
| 0.000000 | 0.000000 | 0.000000 | 0.000000 | 0.000000 |
| −0.044501 | −0.049803 | 0.102954 | −0.288318 | 0.214623 |
| 0.066751 | 0.074704 | −0.154431 | 0.932476 | −0.321935 |
| −0.02250 | −0.024902 | 0.051477 | −0.144158 | 0.107312 |
| −0.014458 | −0.052537 | 0.070731 | −0.193613 | 0.156842 |
| 0.104131 | −0.238461 | 0.107427 | −0.129672 | 0.068098 |
| 0.007468 | 0.362136 | −0.371514 | 1.100816 | −0.077713 |
| −0.074890 | −0.046236 | 0.141880 | −0.633373 | 0.745462 |

Phase 10: OOM Recognition

The OOM recognition phase of the example embodiment is performed according to the pseudocode in Table 9.

TABLE 9

Get LPC coefficients and map them into appropriate clusters
1. Compute $W_o$
2. Compute observable
   $\tilde{T} = \tilde{W}_o$
   $\tilde{T}_i \, i = \tilde{W}_o$ For each $o_k \in O$
      $\tilde{T}_i = \tilde{T}_{ok} \tilde{T}$
      $\tilde{T} = \tilde{T}_i$
   $P_j (O/\lambda) = 1 \cdot \tilde{T}_i$
      1: row unit matrix Phase 11: Displaying the Recognized Speech In the example embodiment, the maximum probability is selected and the recognized speech is displayed.

It is to be understood that the above description it is intended to be illustrative, and not restrictive. Many other embodiments are possible and some will be apparent to those skilled in the art, upon reviewing the above description. For example pattern recognition using an observable operator model may be applied to many different systems that recognize patterns in data, such as discriminant analysis, feature extraction, error estimation, cluster analysis, grammatical inference and parsing, image analysis, character recognition, man and machine diagnostics, person identification, industrial inspection, and more. Therefore, the spirit and scope of the appended claims should not be limited to the above description. The scope of the invention should be determined with reference to the appended claims, along with the full scope of equivalents to which such claims are entitled.

What is claimed is:

1. A computer-implemented method of pattern recognition, comprising:

training a plurality of observable operator models for a plurality of characteristic events, the observable operator models comprising a plurality of observable operators;

receiving an unknown input data stream;

computing a plurality of matching probabilities, one matching probability for each one of the plurality of characteristic events using the plurality of observable operators, wherein each matching probability is a probability that the unknown input matches a particular characteristic event;

selecting a maximum matching probability from the plurality of matching probabilities; and displaying a characteristic event having the maximum matching probability.

2. The method as recited in claim 1, wherein the unknown input data stream occurs at a particular point in an input data stream, the input stream comprising a sequence occurring prior to the unknown input data stream.

3. The method as recited in claim 2, each matching probability is a probability that the unknown input data stream matches a particular characteristic event, given the sequence occurring prior to the unknown input data stream.

4. The method as recited in claim 1, wherein the unknown input data stream is a word and the characteristic events define a vocabulary.

5. The method as recited in claim 1, wherein the training act comprises:

computing a probability transition matrix;

computing an occurrence count matrix;

estimating the plurality of observable operators from the probability transition matrix and the occurrence count matrix; and standardizing the plurality of observable operators.

6. The method as recited in claim 5, wherein standardizing the plurality of observable operators further comprises computing a mean and standard deviation for each observable operator.

7. A computer-readable medium having computer-executable instructions for performing a method of recognizing speech, the method comprising:

sampling a first input stream, resulting in a plurality of samples;

performing a spectral analysis of the samples to obtain a plurality of feature vectors;

clustering the feature vectors to form a plurality of observation vectors;

training at least one observable operator model using the observation vectors; and recognizing at least one part of speech from a second input stream using the at least one observable operator model.

8. The computer-readable medium as recited in claim 7, wherein the spectral analysis comprises:

removing noise from the samples;

performing pre-emphasis on the samples in order to spectrally flatten the samples;

blocking the spectrally flattened samples into framed samples;

windowing the framed samples to obtain windowed samples with signal energy substantially concentrated at the center of the frames;

performing auto-correlation analysis for each windowed sample to obtain auto-correlated samples; and performing linear predictive coding (LPC) analysis for each auto-correlated sample to obtain feature vectors.

9. The computer-readable medium as recited in claim 7, wherein the at least one observable operator model is stateless.

10. The computer-readable medium as recited in claim 9, wherein a probability of selecting an operator is computed using the operator itself.

11. The computer-readable medium as recited in claim 10, wherein the computational efficiency is about O(n+k) where n is a number of samples and k is a constant.

12. The computer-readable medium as recited in claim 10, wherein the at least one part of speech comprises a concatenation of a plurality of operators.

13. A data structure of an observable operator model used to recognize patterns, comprising:

a plurality of characteristic events corresponding to a input stream, the input stream comprising a plurality of stream elements and the input stream comprising a plurality of sequences;

an initial distribution vector, wherein each element of the initial distribution vector comprises a particular probability that a particular characteristic event is an initial event, the particular characteristic event being one of the plurality of characteristic events;

a probability transition matrix, wherein each element of the probability transition matrix comprises an estimate of a particular probability of producing a particular characteristic event, after observing a particular sequence;

an occurrence count matrix, wherein each element of the occurrence count matrix comprises an estimate of a particular probability of producing the particular characteristic event, after observing a particular stream element followed by the particular sequence; and at least one observable operator calculable from the probability transition matrix and the occurrence count matrix;

wherein the plurality of characteristic events, the initial distribution vector, the probability transition matrix, the occurrence count matrix, and the at least one observable operator are stored on a storage medium during a training phase and retrievable during a recognition phase.

14. The data structure as recited in claim 13, wherein each element of the occurrence count matrix comprises a calculation, during the training phase, of how frequently the particular characteristic event occurs after observing the particular stream element followed by the particular sequence.

15. The data structure as recited in claim 13, wherein each element of the occurrence count matrix comprises a number of occurrences of the particular stream element followed by the particular sequence, the number being countable during the training phase.

16. The data structure as recited in claim 13, wherein each element of the probability transition matrix comprises a calculation, during the training phase, of how frequently the particular characteristic event occurs, after observing the particular sequence.

17. The data structure as recited in claim 13, wherein each element of the probability transition matrix comprises a number of occurrences of the particular sequence, the number being countable during the training phase.

18. The data structure as recited in claim 13, wherein the observable operator ($\tau$) is a linear, observable operator.

19. The data structure as recited in claim 13, wherein the columns of the probability transition matrix sum to 1.

20. The data structure as recited in claim 19, wherein the elements of the initial distribution vector sum to 1.

21. The data structure as recited in claim 20, wherein at least one element of the matrices and vectors is a negative value.

22. The data structure as recited in claim 13, wherein the at least one observable operator is equal to the inverse of the probability transition matrix times an element of the occurrence count matrix.

23. A computer-readable medium having computer-executable instructions for performing a method for modeling a process with the data structure of the observable operator model as recited claim 13, the method comprising:

creating at least one data structure of the observable operator model;

storing the plurality of characteristic events of the at least one data structure of the observable operator model;

storing the initial distribution vector of the at least one data structure of the observable operator model;

storing the probability transition matrix of the at least one data structure of the observable operator model;

storing the occurrence count matrix of the at least one data structure of the observable operator model; and storing the at least one observable operator of the at least one data structure of the observable operator model.

24. The computer-readable medium as recited in claim 23, the method further comprising:

reading the plurality of characteristic events of the at least one data structure of the observable operator model;

reading the initial distribution vector of the at least one data structure of the observable operator model;

reading the probability transition matrix of the at least one data structure of the observable operator model;

reading the occurrence count matrix of the at least one data structure of the observable operator model; and reading the at least one observable operator of the at least one data structure of the observable operator model.

25. A method for recognizing speech, comprising:

sampling an input signal;

converting the input signal to a discrete signal;

storing the discrete signal in a buffer;

reading a frame of data from the buffer;

checking for silence or noise in the frame;

removing any silence and noise from the frame;

spectrally flattening a signal in the frame;

performing frame windowing on the frame;

computing a moving weighted average for the frame;

performing feature extraction on the frame using a mathematical model;

clustering the frame with previously read frames;

training a plurality of observable operator models;

recognizing at least one unknown word using the observable operator models; and displaying a recognized word corresponding to the at least one unknown word.

26. The method as recited in claim 25, wherein reading the frame of data from the buffer is performed repeatedly, until the input signal is exhausted.

27. The method as recited in claim 25, further comprising:

discarding the frame and reading a next frame; and introducing overlap for a next read.

28. The method as recited in claim 25, wherein training the plurality of observable operator models comprises:

computing a transition between observables in the observation sequence; and computing an estimate of the observables.

29. The method as recited in claim 28, wherein computing the transition between observables in the observation sequence is performed by computing a probability of observing possible subsequences among the observables.

30. The method as recited in claim 29, wherein computing an estimate of the observables comprises:

developing the plurality of observable operator models; and structuring the probability to produce substantially well-defined linear operators for the plurality of observable operator models.

31. The method as recited in claim 30, further comprising:

standardizing the plurality of observable operator models such that variation between similar signals is substantially minimized; and storing the plurality of observable operator models in a system repository.

32. The method as recited in claim 30, wherein recognizing the at least one unknown word using the plurality of observable operator models comprises:

determining a distribution of the observables;

computing a probability for each of the plurality of observable operator models in the system repository; and selecting a most probable one of the plurality of observable operator models as the at least one recognized word.

33. The method as recited in claim 25, wherein spectrally flattening the signal is performed using a first order filter.

34. The method as recited in claim 25, wherein performing frame windowing is performed by multiplying the signal in the frame by a window so that information in the signal is concentrated substantially towards a center of the frame.

35. The method as recited in claim 34, wherein the window is selected from the group consisting of a Hamming window and a Hanning window.

36. The method as recited in claim 25, wherein computing the moving weighted average for the frame is performed using auto-correlation.

37. The method as recited in claim 25, wherein the mathematical model is linear predictive coding.

38. The method as recited in claim 37, wherein the linear predictive coding models a vocal tract.

39. The method as recited in claim 25, wherein clustering the frame with previously read frames comprises grouping similar features.

40. The method as recited in claim 39, wherein clustering the frame with previously read frames comprises obtaining an observation sequence.

41. The method as recited in claim 40, wherein obtaining the observation sequence comprises obtaining indices of the clusters.

\* \* \* \* \*